ized signal levels responsive thereto is disclosed. The gated compressor includes a distortionless multiplier which multiplies an AC signal from a factor defined by a DC control signal. The compressor includes a plurality of channels each responsive to a signal produced in response to the multiplier's output. As long as the signal, supplied to any channel, does not exceed a selected level for the particular signal, the output of a multi-input OR gate is constant, thereby resulting in the supply of a constant DC control signal to the multiplier. However, when the signal supplied to any channel exceeds a prescribed level, the level of the DC control signal is reduced to reduce the multiplier's output level and thereby prevent the signal applied to any channel from exceeding its prescribed level.

United States Patent
Fletcher et al.

[11] 3,800,237
[45] Mar. 26, 1974

[54] GATED COMPRESSOR, DISTORTIONLESS SIGNAL LIMITER

[76] Inventors: James C. Fletcher, Administrator of the National Aeronautics and Space Administration with respect to an invention of; Raymond C. Woodbury, La Canada, Calif.

[22] Filed: June 28, 1972

[21] Appl. No.: 266,912

[52] U.S. Cl................ 328/168, 328/160, 328/172, 333/14, 307/237
[51] Int. Cl. .......................... H03g 7/00, G06g 7/16
[58] Field of Search ............ 307/229, 237; 328/150, 328/156, 160, 163, 168, 169, 171, 172; 330/28, 29; 333/14

[56] References Cited
UNITED STATES PATENTS

| | | | |
|---|---|---|---|
| 3,662,290 | 5/1972 | Elliott | 328/168 X |
| 3,581,222 | 5/1971 | Dunwoodie | 307/235 X |
| 2,787,673 | 4/1957 | Cutler | 328/168 X |
| 3,176,238 | 3/1965 | Dickerson, Jr. | 328/168 X |
| 3,409,834 | 11/1968 | Cullis et al. | 328/169 X |
| 3,487,222 | 12/1969 | Martens | 328/173 X |
| 3,562,553 | 2/1971 | Roth | 328/160 X |
| 3,668,533 | 6/1972 | Fish et al. | 328/168 |

*Primary Examiner*—Rudolph V. Rolinec
*Assistant Examiner*—L. N. Anagnos
*Attorney, Agent, or Firm*—Monte F. Mott; Paul F. McCaul; John R. Manning

[57] ABSTRACT

A distortionless gated compressor for limiting the amplitude of a signal so as not to produce undesired signal levels responsive thereto is disclosed. The gated compressor includes a distortionless multiplier which multiplies an AC signal from a factor defined by a DC control signal. The compressor includes a plurality of channels each responsive to a signal produced in response to the multiplier's output. As long as the signal, supplied to any channel, does not exceed a selected level for the particular signal, the output of a multi-input OR gate is constant, thereby resulting in the supply of a constant DC control signal to the multiplier. However, when the signal supplied to any channel exceeds a prescribed level, the level of the DC control signal is reduced to reduce the multiplier's output level and thereby prevent the signal applied to any channel from exceeding its prescribed level.

5 Claims, 4 Drawing Figures

3,800,237

GATED COMPRESSOR, DISTORTIONLESS SIGNAL LIMITER

ORIGIN OF INVENTION

The invention described herein was made in the performance of work under a NASA contract and is subject to the provisions of Section 305 of the National Aeronautics and Space Act of 1958, Public Law 85-568 (72 Stat.435; 42 U.S.C.2457).

BACKGROUND OF THE INVENTION

1. Field of the Invention

The present invention generally relates to signal compression, and more particularly, to a gated-compressor, distortionless signal limiter.

2. Description of the Prior Art

There are many applications in which it is necessary to limit the amplitude of an input signal which causes the production of a desired phenomenon so that certain conditions or levels are not exceeded. For example, qualification testing of space craft and space craft components generally involve subjecting test objects to high intensity accoustic energy to simulate the effect of booster-generated noise during take-off and in transsonic flight. Such testing is performed in a reverberant chamber which is excited by an electropneumatic transducer. A stream of air or nitrogen, passing through the throat of the transducer, is modulated by a valve arrangement which is actuated by a voice coil. The coil is excited by a power amplifier which in turn is driven by a signal generator/amplifier arrangement which produces a frequency spectrum, described by the test authority. The transducer, which is used for this purpose, is quite expensive and is subject to severe damage to its voice coil whenever the input to the coil exceeds a predetermined amperage level, e.g., 6 amperes.

Herebefore, such damage has been prevented by use of signal clippers and compressors, the use of which is in most instances undesirable and in many instances unacceptable. Clippers, though eliminating peaks introduce distortion and furthermore, do not limit power input sufficiently. Compressors introduce unacceptable distortion due to asymmetrical action. Therefore, whenever the introduction of distortion is unacceptable and/or power input must be accurately limited, the use of clippers and compressors as used in the prior art is unacceptable.

There are many other applications in which it is necessary or desirable to limit the input signal by compressing it without introducing any distortion. For example, most power amplifiers in high fidelity or stereo systems are capable of driving the speakers to produce audio levels above those which are deemed safe for the average listener. In such systems it would be desirable to be able to limit the output of the power amplifier without the introduction of any distortion so that the audio level from the driven speakers is not exceeded. A need therefore exists for a signal limiting system for compressing a signal without producing distortion so that in response to the signal a phenomenon is produced without undesired conditions.

OBJECTS AND SUMMARY OF THE INVENTION

It is a primary object of the present invention to provide a new improved signal limiting system.

Another object of the present invention is to compress and limit the amplitude of a signal without distorting the rest of its characteristics so that the signal does not cause the production of undesired conditions, or undesired signal levels.

A further object of the present invention is the provision of a signal limiter capable of limiting only the amplitude of a signal without distorting its frequency characteristics upon the occurrence of certain preselected conditions.

Yet a further object of the present invention is to provide a method for limiting the amplitude of a signal without distorting its frequency characteristics whenever one or more conditions arise.

These and other objects of the present invention are achieved by multiplying an input signal in a multiplier by a controllable factor. This factor is constant as long as no objectionable condition arises. Consequently, the output of the multiplier is directly a function of the input signal and increases or decreases as the input signal increases or decreases in amplitude. It is the output of the multiplier which is used to control the particular desired phenomenon. If, however an objectionable condition arises the factor by which the input signal is multiplied is reduced, thereby reducing the output signal amplitude. The system may be controlled so that as soon as an undesired condition arises the output of the multiplier is prevented from exceeding a preselected value irrespective of the increasing amplitude of the input signal to prevent the undesired condition from exceeding preselected levels.

The present invention comprises a novel gated compressor arrangement which enables any condition of a preselected adjustable signal level to control the factor by which the input signal is multiplied in the multiplier and thereby control the output signal therefrom.

The novel features of the invention are set forth with particularity in the appended claims. The invention will best be understood from the following description when read in conjunction with the accompanying drawings.

DESCRIPTION OF THE PREFERRED EMBODIMENTS

The present invention will first be described in connection with a specific embodiment used to control the signal supplied to a transducer which is employed to produce acoustic energy in a reverberant chamber in which an object is tested, so as not to exceed the current and voltage ratings of the voice coil of the transducer. As will become apparent, however, from the following description, the invention is not limited thereto and may be employed whenever distortionless signal limiting is required.

Figure 1:
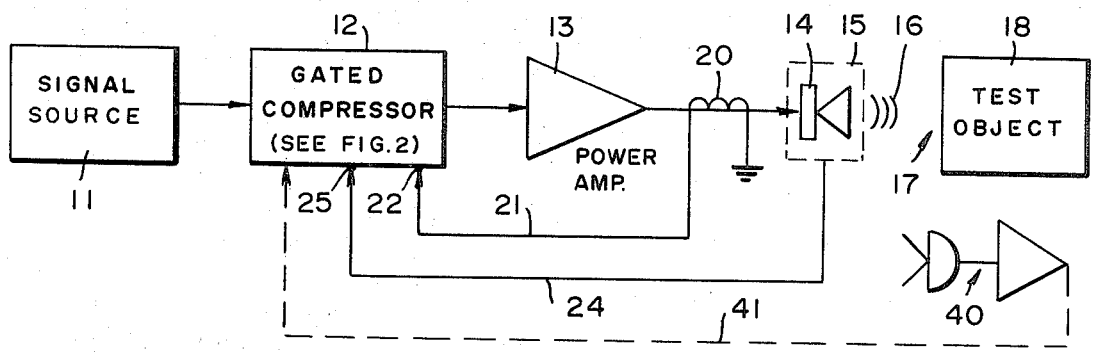
FIG. 1 is a block diagram useful in explaining the function of the present invention.

Attention is drawn to FIG. 1 wherein numeral 11 designates a signal source which supplies an input signal through the novel gated compressor 12 of the present invention to power amplifier 13. The output of the latter is supplied to a voice coil 14 of a transducer 15 which produces acoustic energy, represented by lines 16, in a reverberant chamber 17 in which a test object 18 is assumed to be located.

In the present description it is assumed that the function of the gated compressor 12 is to control the signal supplied to the power amplifier 13 so that the current through the voice coil and the voltage thereacross do not exceed preselected levels. A current transformer 20 is used to monitor the current through the voice coil and supplies a current signal via lines 21 to input 22 of compressor 12, while the voltage across the voice coil is assumed to be supplied as a voltage signal via lines 24 to input terminal 25 of the gated compressor 12.

Figure 2:
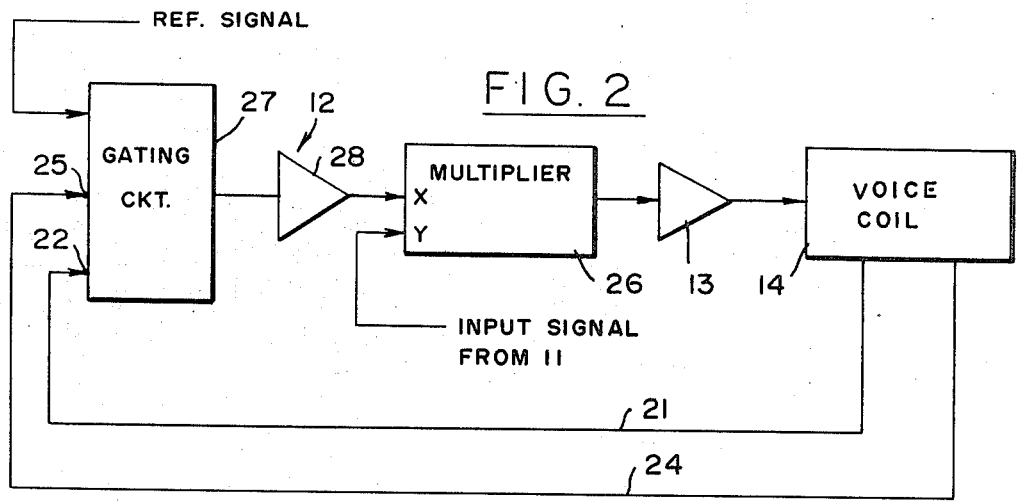
FIG. 2 is a general block diagram of the novel gated compressor of the present invention.

As seen from FIG. 2, the novel gated compressor includes a distortionless multiplier 26, a gating circuit 27 and an amplifier circuit 28. The multiplier 26 provides an output to power amplifier 13 which in turn drives the voice coil 14. The multiplier output is a function of the frequencies and amplitudes of the signals applied to its input terminals, designated X and Y. In the present embodiment, the signal applied to the Y terminal is received from signal source 11 and is an AC signal which varies both in amplitude and frequency, while the signal applied to terminal X is a DC signal from amplifier circuit circuit 28 which is a function of the output of the gating circuit 27. The latter is shown receiving the current and voltage signals via lines 21 and 24 respectively at terminals 22 and 25.

Briefly, as long as neither the current through nor the voltage across the voice coil 14 exceeds a preselected level, the output of the gating circuit 27 is constant and therefore the output of amplifier circuit 28 applied to the X terminal of the multiplier 26 is constant. As a result, the multiplier's output varies both in amplitude and frequency only as a function of the amplitude and frequency of the signal from source 11. However, whenever either the current through or the voltage across the voice coil 14 exceeds a preselected safe level for the operation of the voice coil, thereby representing an undesired condition the gating circuit 27 supplies a controlling signal to the amplifier circuit 28 to decrease the amplitude of the DC signal supplied to the X terminal of the multiplier 26. As a result, the factor by which the amplitude of the input signal is multiplied is reduced and therefore the amplitude of the output of the multiplier is prevented from increasing at the rate of increase of the input signal at terminal X. In practice the amplitude of the output of the multiplier 26 is prevented from exceeding a level which causes either the current or the voltage in the voice coil from exceeding the desired level. It is appreciated by those familiar with the art that by supplying the gating circuit 27 with the current and voltage indicating signals a feedback loop is formed. By controlling the gain of the amplifier circuit 28 the compressor 12 can be adjusted to prevent the current through or the voltage across the voice coil from ever reaching amplitudes which could permanently damage it. It should be stressed, that in the present invention the amplitude of the signal which is supplied to the voice coil 14 through the amplifier 13 is not clipped, a state which would have produced unacceptable distortion, but rather is controlled by controlling the factor at terminal X of multiplier 26 by which the input signal from source 11 is multiplied in the distortionless multiplier 26. Consequently, no distortion is introduced in the signal from source 11 which is finally supplied to the voice coil 14.

Figure 3:
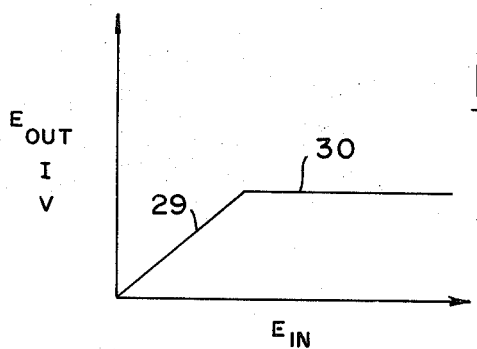
FIG. 3 is a simple diagram useful in summarizing the operation of the invention.

The operation of the gated compressor 12 may be summarized in connection with the diagram shown as FIG. 3 wherein the abscissa represents the amplitude of the ($E_{in}$) to terminal X of the multiplier and the ordinate, the output signal amplitude ($E_{out}$) or the current (I) through or voltage (V) across the voice coil. As long as neither safe current or voltage levels are exceeded the output signal amplitude increases as the input signal amplitude increases as presented by line 29. However, once the safe level of either the current or the voltage is reached, the factor by which the input signal is multiplied is reduced to prevent the output signal amplitude from increasing at the rate of increase of the input signal amplitude as represented by line 30. By controlling the loop, gain line 30 may be substantially flat i.e. the output signal amplitude may be prevented from ever exceeding a given level so that the safe current or voltage level is never exceeded.

Figure 4:
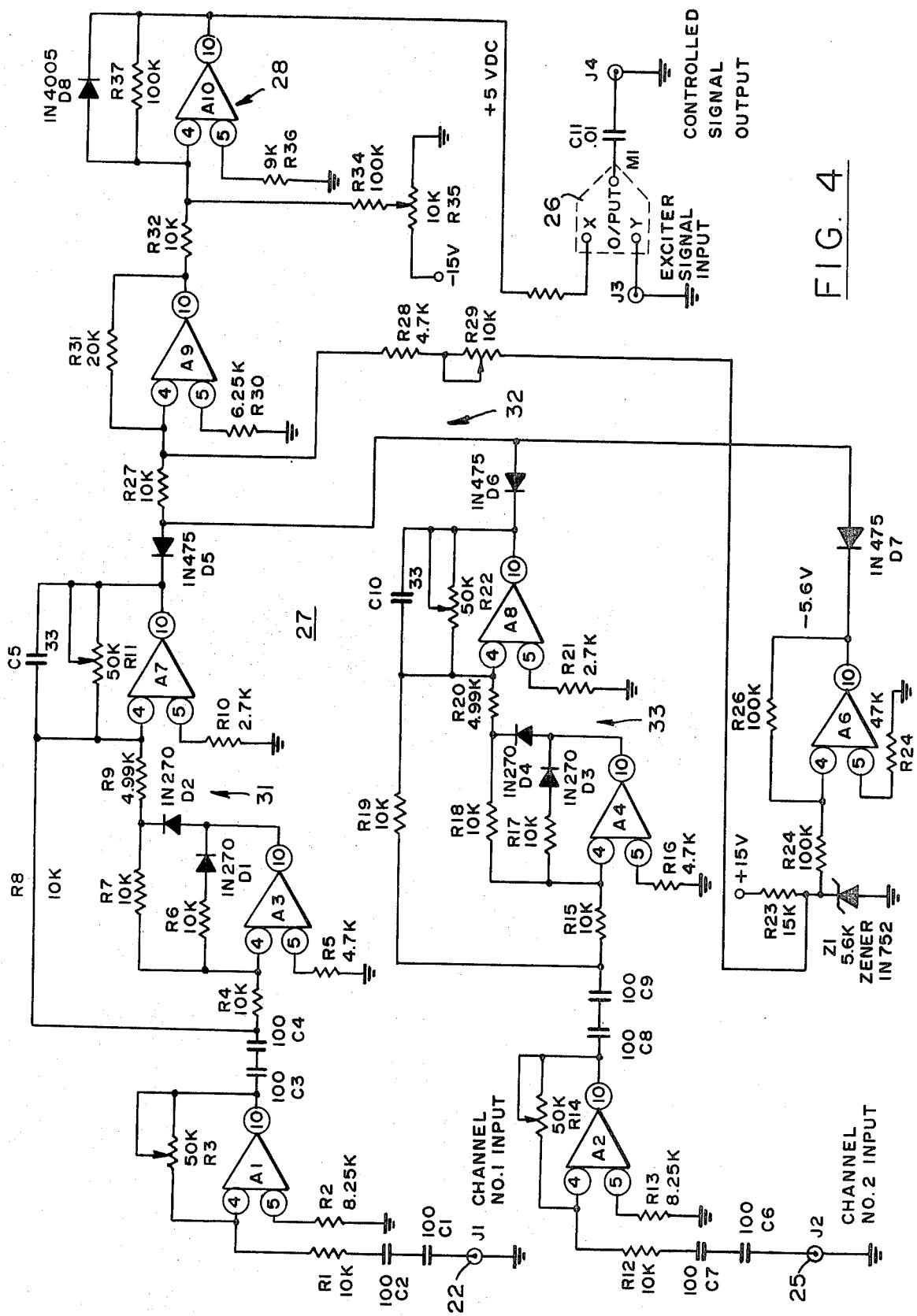
FIG. 4 is a detailed diagram of one embodiment of the invention.

The present invention and its advantages may further be explained in conjunction with FIG. 4 which is a complete schematic diagram of one embodiment actually reduced to practice. Therein elements like those previously described are designated by like numerals. This particular embodiment consists of two channels, channel number 1 being supplied with a current signal at input terminal 22, and channel number 2 being supplied with a voltage signal at terminal 25. The two channels are identical, eaach comprising an operational amplifier and an AC-to-DC converter, the output of which is in turn supplied to a two input OR gate, as will be described hereinafter. Channel number 1 to which the current signal is applied at input terminal 22 consists of operational amplifier A1 and an AC-to-DC converter 31 which comprises operational amplifiers A3 and A7. The gain of amplifier A1 is controlled by means of variable resistor R3 in combination with the input resistor R1. The output of amplifier A7 is a DC voltage which is proportional to the average value of the input signal applied to terminal 22. Filtering is effected by means of capacitor C5 to minimize ripple voltage. The output of AC to DC converter 31 is applied to a diode D5 which together with diodes D6 and D7 forms a two input OR gate 32.

Similarly, channel 2 to which an input signal is applied at terminal 25 comprises an operational amplifier A2, whose gain is controlled by the setting of variable resistor R14 in conjunction with fixed resistor R12 and channel 2 also includes AC-to-DC converter 33, formed by operational amplifiers A4 and A8. The output of the latter is applied to diode D6.

The gating circuit 27 also includes a unity gain inverter amplifier A6 which receives a reference voltage from an appropriate source, i.e., plus 15 volts through resistor R23 and which is zenered by Zener diode Z1. The zenered voltage of Zener diode Z1 is assumed to be plus 5.6 volts and therefore the output of amplifier A6 which is connected to the cathode of diode D7 is indicated as minus 5.6 volts. The reference voltage of 5.6 volts is also applied to the inverter amplifier A9 through resistor R28 and variable resistor R29.

The junction point of resistor R27 and R28 is connected to the input terminal of an inverter amplifier A9, whose output is supplied to an input of the amplifier circuit 28 through resistor R32. Circuit 28 is shown comprising an operational amplifier A10 which is supplied with an input potential through resistor R34 and a variable resistor R35 connected across an appropriate voltage source, for example, minus 15 volts. The output of amplifier A10 is supplied to the X input terminal of multiplier 26. As previously pointed out, the input to the Y terminal of the multiplier 26 is the input signal from signal source 11, which varies both in amplitude and frequency.

In operation, as long as each of diodes D5 and D6 is back biased diode D7 is conducting. Consequently, ignoring diode voltage drops, the potential at the anode of each of the diodes is minus 5.6 volts. Resistor R29 is adjusted so that the output of amplifier A9 is zero. Consequently, the input applied to amplifier A10 is only controlled by the setting of R35 and therefore, the amplitude of the DC signal, applied to the X terminal of the multiplier 26 remains constant, as long as the setting of R35 is not changed. However, as soon as either diode D5 or D6 is forward biased, a condition which arises when the voltage at the cathode of either of these diodes exceeds minus 5.6 volts, diode D7 is back biased and the potential at the junction between resistor R27 and diode D5 exceeds the potential at the junction between resistor R24 and R29. As a result, the voltage at the output of amplifier A9 is no longer zero but rather a positive voltage which tends to subtract from the negative voltage supplied by the variable resistor R35. Consequently, the amplitude of the output DC signal of amplifier A10 drops, thereby dropping the signal amplitude at terminal X of the multiplier 26. As a result, the amplitude of the output signal of the multiplier 26 decreases.

As previously pointed out, a distortionless multiplier is employed. Consequently, the reduction of the amplitude of the DC control signal from amplifier A10 only reduces the amplitude of the output of the multiplier 26, without affecting its frequency characteristic, which is only a function of the frequency characteristic of the input signal, applied to terminal Y.

In the present invention, variable resistor R3 is adjusted so that only when the current signal at terminal 22 reaches a preselected level is diode D5 forward biased and diode D7 is back biased. Thereafter, as the current at terminal 22 increases amplifier A9 produces an increasing positive output which causes the output of amplifier A10 to decrease, thereby decreasing the amplitude of the output signal of the multiplier 26. However, as long as the current at terminal 22 does not reach the preselected level the diode D5 remains back biased and therefore a constant control signal is supplied to the X terminal of multiplier 26, thereby not affecting the amplitude of the output signal.

Similarly, diode D6 becomes forward biased only when the amplitude of the signal at terminal 25 reaches a preselected value and thereafter as the amplitude of this signal increases the amplitude of the control signal from amplifier A10 to Terminal X of the multiplier decreases. However, as long as the level of the signal at 25 is below the preselected level diode D6 remains back biased and therefore variations of the level at terminal 25 below the preselected level do not affect the amplitude of the output of multiplier 26.

From the foregoing, it is thus seen that the output of the multiplier 26 is not affected, i.e., compression does not take place, as long as the signal applied to the input terminal of either of the two channels does not exceed the preselected value. However, once the level of the signal applied to either channel reaches the preselected value, the diode, associated with the particular channel, is forward biased. Thereafter, as the input signal level increases the output of amplifier A10 decreases the amplitude of the DC control signal, applied to the X terminal of the multiplier, thereby causing a reduction in the amplitude of the multiplier's output. However, no distortion occurs since a distortionless multiplier is employed and the control signal applied to its X terminal only decreases the amplitude of its output signal.

The novel invention may be thought of as a circuit control system in which tightness and system stability are in a sense controlled by the gain settings of amplifiers A1, A2, A9 and A10. The gain settings may be selected so that as soon as the amplitude of a signal to either channel reaches the preselected value the control signal applied to the X terminal of the multiplier 26 is varied so that the output signal therefrom is inhibited from having an amplitude which would cause the input signal to either channel to exceed its preselected level. In the particular application for which the invention was conceived and designed the gain settings of the various amplifiers can be chosen to prevent the output of multiplier 26 from ever driving the voice coil 14 of the transducer 15 with a current about 6 amperes or a voltage of 30 volts. In the particular application, capacitor C5 and C10 in channels numbers 1 and 2, respectively were chosen to provide a desired control action or feedback speed so as to ensure that the current through or voltage across the voice coil of the particular transducer selected never exceeds a value which may damage the coil.

It should again be stressed that by employing the novel gating circuit 27 together with amplifier circuit 28 and the distortionless multiplier 26 compression is achieved when the signal to either channel exceeds a related level which represents an undesired condition. Furthermore it should be apparent that if more than one signal in the various channels exceed their related threshold levels the control signal to the multiplier is reduced by a factor which is a function of the largest difference between any of the signals and its associated threshold level. This should be obvious from FIG. 4 since the OR-gate will be forward biased by the largest difference.

Although in FIG. 4 only 2 channels are shown it should be apparent that any number of chanels, e.g., n, may be incorporated together with an n-input OR gate. For example, if desired the output of a microphone/amplifier unit in chamber 17 designated in FIG. 1 by numeral 40 may be supplied to a third channel of the gated compressor to limit the multiplier's output signal whenever the level of the acoustic energy in the chamber exceeds a selected level. In FIG. 1 the connection between unit 40 and the compressor 12 is designated by dashed line 41.

Although particular embodiments of the invention have been described and illustrated herein, it is recognized that modifications and variations may readily occur to those skilled in the art and consequently it is intended that the claims be interpreted to cover such modifications and equivalents. What is claimed is:

1. A signal compression system comprising:
a source for providing a variable amplitude signal;
control means for providing a direct-current control signal;

a multiplier for providing an output whose amplitude is a function of the product of the amplitude of said first signal and the amplitude of said control signal; and channel means coupled to said control means and including n channels, each channel being responsive to a different input signal, said channel means further including gating means for controlling said control means to vary the amplitude of said control signal from a selected amplitude only when the input signal to any of said channels exceeds a preselected level associated therewith, n being an integer not less than two, the magnitude by which the amplitude of said control signal is varied from said selected amplitude being directly related to the largest difference by which the input signal to any of said channels exceeds the preselected level associated therewith.

2. A signal compression system as described in claim 1 wherein said first signal is an alternating-current signal.

3. A signal compression system as described in claim 2 wherein said channel means includes an n-input OR gate which provides a constant amplitude output as long as none of the signals applied to said n channels exceeds the preselected level associated therewith, with said OR gate providing an output which varies in amplitude in direct relation to the largest increase of any of said input signals above its preselected level.

4. A signal compression system as described in claim 3 wherein each of said channels includes an AC to DC converter and said OR gate includes a reference diode and n control diodes each associated with a different channel, with all of said control diodes being back biased as long as none of the input signals applied to said channels exceeds its preselected level.

5. A method of limiting the amplitude of an input signal to a device so that none of the signals produced therein exceeds a preselected amplitude level associated therewith, the steps comprising:

supplying to said device a signal whose amplitude is equal to the product of the amplitude of a variable amplitude input signal and the amplitude of a control signal;

monitoring at least two of the signals produced in said device, and reducing the amplitude of said control signal from a selected amplitude so as to reduce the amplitude of the signal which is supplied to said device whenever the amplitude of any of the monitored signals exceeds a preselected amplitude associated therewith, the magnitude by which the control signal amplitude is reduced from said selected amplitude being directly related to the largest amplitude difference by which the amplitude of any of the monitored signals exceeds the preselected amplitude associated therewith.

* * * * *